(12) United States Patent
Matsui et al.

(10) Patent No.: US 10,814,704 B2
(45) Date of Patent: Oct. 27, 2020

(54) OPERATION INPUT DETECTION DEVICE, AND CALIBRATION DEVICE FOR CAPACITANCE SENSOR

(71) Applicant: AISIN SEIKI KABUSHIKI KAISHA, Kariya-shi (JP)

(72) Inventors: Seika Matsui, Kariya (JP); Junya Nakamura, Kuwana (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 272 days.

(21) Appl. No.: 15/748,244

(22) PCT Filed: Jun. 29, 2016

(86) PCT No.: PCT/JP2016/069243
§ 371 (c)(1),
(2) Date: Jan. 29, 2018

(87) PCT Pub. No.: WO2017/022376
PCT Pub. Date: Feb. 9, 2017

(65) Prior Publication Data
US 2018/0215241 A1 Aug. 2, 2018

(30) Foreign Application Priority Data

Aug. 4, 2015 (JP) .................. 2015-1545 81

(51) Int. Cl.
*B60J 5/10* (2006.01)
*E05F 15/75* (2015.01)
(Continued)

(52) U.S. Cl.
CPC .............. *B60J 5/101* (2013.01); *B60R 25/31* (2013.01); *E05B 49/00* (2013.01); *E05B 81/78* (2013.01);
(Continued)

(58) Field of Classification Search
CPC ........... B60J 5/101; E05F 15/75; B60R 25/31; E05B 49/00; E05B 81/78; E05B 81/76; E05B 81/18; E05Y 2900/546
See application file for complete search history.

(56) References Cited

U.S. PATENT DOCUMENTS

| | | | |
|---|---|---|---|
| 2006/0132939 A1* | 6/2006 | Blank | B60R 1/12 359/838 |
| 2010/0214112 A1* | 8/2010 | Ishihara | B60R 25/246 340/686.1 |
| 2014/0066124 A1* | 3/2014 | Novet | H04M 1/72569 455/556.1 |

FOREIGN PATENT DOCUMENTS

| CN | 101765693 A | 6/2010 |
|---|---|---|
| CN | 103685721 A | 3/2014 |

(Continued)

OTHER PUBLICATIONS

English translation of the International Preliminary Report on Patentability and Written Opinion dated Feb. 6, 2018 in PCT/JP2016/069243.

(Continued)

*Primary Examiner* — Nathaniel T Woodward
(74) *Attorney, Agent, or Firm* — Oblon, McClelland, Maier & Neustadt, L.L.P.

(57) ABSTRACT

An operation input determination device includes an operation input detector, a movement detector, and a sensor output correction unit. The operation input detector detects an operation input to an operation input unit, which is arranged on a vehicle surface, based on a sensor output of a capacitance sensor that changes when a detection subject moves toward and away from the operation input unit. The movement detector detects movement of a vehicle. The sensor (Continued)

output correction unit executes calibration on the capacitance sensor when movement of the vehicle is detected.

10 Claims, 6 Drawing Sheets

(51) Int. Cl.
*B60R 25/31* (2013.01)
*E05B 49/00* (2006.01)
*E05B 81/78* (2014.01)
*E05B 83/18* (2014.01)
*E05B 81/76* (2014.01)

(52) U.S. Cl.
CPC .............. *E05F 15/75* (2015.01); *E05B 81/76* (2013.01); *E05B 83/18* (2013.01); *E05Y 2900/546* (2013.01)

(56) References Cited

FOREIGN PATENT DOCUMENTS

| JP | 9-318384 A | 12/1997 |
| JP | 2008-241550 A | 10/2008 |
| JP | 5106533 B2 | 12/2012 |

OTHER PUBLICATIONS

International Search Report dated Sep. 13, 2016 in PCT/JP2016/069243 filed Jun. 29, 2016.
Combined Office Action and Search Report dated Mar. 29, 2019 in Chinese Patent Application No. 201680044810.4 (with English translation of the Office Action and English translation of category of cited documents) citing documents AO and AP therein, 18 pages.

* cited by examiner

OPERATION INPUT DETECTION DEVICE, AND CALIBRATION DEVICE FOR CAPACITANCE SENSOR

TECHNICAL FIELD

The present invention relates to an operation input detection device and a calibration device for a capacitance sensor.

BACKGROUND ART

A known operation input detection device performs a detection of an operation input to an operation input unit, which is arranged on a vehicle surface, based on a sensor output of a capacitance sensor that changes when a detection subject moves toward and away from the operation input unit. For example, patent document 1 discloses a configuration that allows a door of the vehicle to be locked and unlocked in a non-contact manner by detecting the hand of a user proximate to a door handle of the vehicle. This improves the convenience.

Further, the operation input detection device for a vehicle is exposed to sudden environmental changes. This easily results in an offset (discrepancy) in the sensor output of the capacitance sensor. However, even in such a case, calibration (correction) can be performed to set a new reference for the sensor output. This keeps a satisfactory detection sensitivity for the operation input.

PRIOR ART DOCUMENT

Patent Document

Patent Document 1: Japanese Patent No. 5106533

SUMMARY OF THE INVENTION

Problems that are to be Solved by the Invention

Nevertheless, during use under the actual environment, the capacitance sensor may be calibrated in a state affected by an object that is located near the vehicle, for example, a person or a wall. In order to avoid decreases in the sensitivity that would be caused by such calibration, the calibration may be repeated in short intervals. However, this will increase power consumption and decrease a charged capacity of an on-board power supply (battery). In this regard, there is still room for improvement.

It is an object of the present invention to provide an operation input detection device and a calibration device for a capacitance sensor that can set a reference for a sensor output of the capacitance sensor further properly.

Means for Solving the Problem

To achieve the above object, an operation input determination device according to one aspect of the present invention includes an operation input detector, a movement detector, and a sensor output correction unit. The operation input detector detects an operation input to an operation input unit, which is arranged on a vehicle surface, based on a sensor output of a capacitance sensor that changes when a detection subject moves toward and away from the operation input unit. The movement detector detects movement of a vehicle. The sensor output correction unit executes calibration on the capacitance sensor when movement of the vehicle is detected.

EMBODIMENTS OF THE INVENTION

One embodiment of an operation input detection device will now be described with reference to the drawings.

Figure 1:
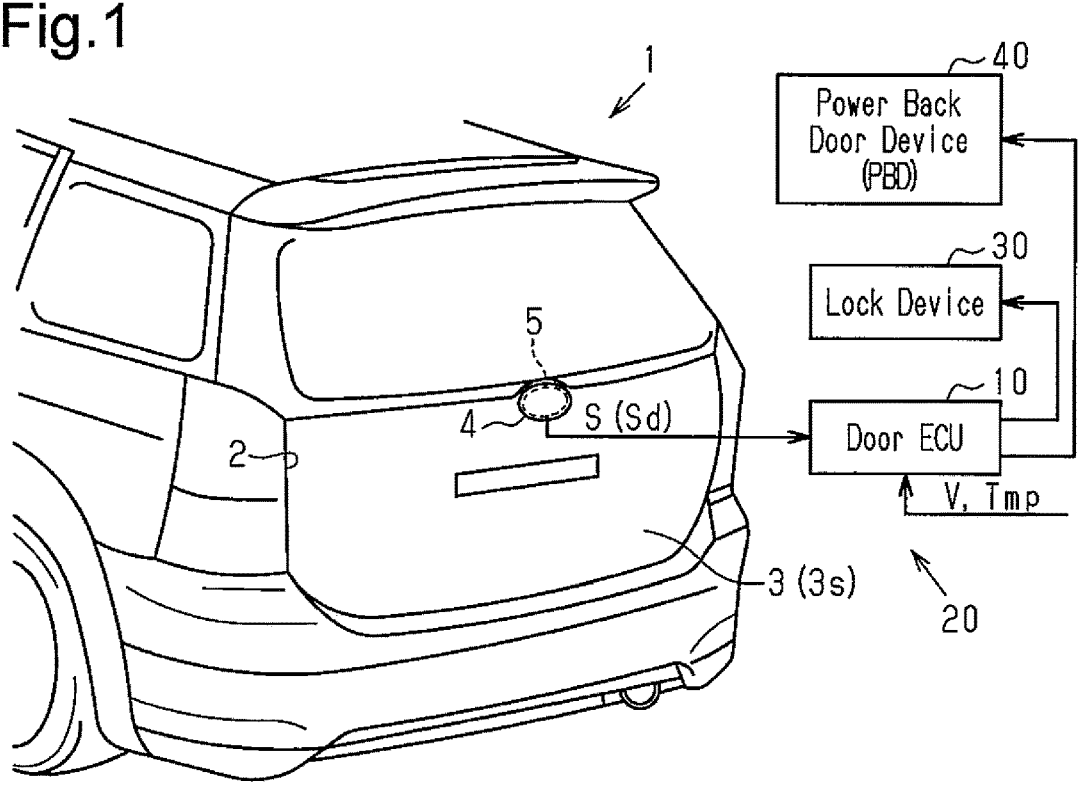
FIG. 1 is a schematic diagram showing an emblem switch arranged on a back door of a vehicle according to one embodiment of the present invention.

As shown in FIG. 1, a rear end of a vehicle 1 includes a door opening 2. A back door 3 that swings upward to open and close is arranged in the door opening 2. The back door 3 pivots about an upper end of the door opening 2. Further, the back door 3 includes an outer surface 3s provided with an emblem 4 of the vehicle 1. In the vehicle 1, the emblem 4 serves as an operation input unit used to open the back door 3.

Specifically, the present embodiment includes a capacitance sensor 5 located inside the emblem 4. Further, a door ECU 10 receives a sensor output S (detection value Sd of sensor output S) of the capacitance sensor 5. Thus, in the vehicle 1 of the present embodiment, the door ECU 10 functions as an operation input detector that performs a detection of an operation input to the emblem 4, which serves as the operation input unit.

More specifically, the sensor output S of the capacitance sensor 5 changes when a detection subject moves toward and away from the emblem 4. In addition, the door ECU 10 detects, for example, a proximate operation input (such as "hand holding operation") to the emblem 4 based on the sensor output S of the capacitance sensor 5. Thus, the vehicle 1 of the present embodiment includes an emblem switch 20 that serves as an operation input detection device.

In more detail, when the door ECU 10 of the present embodiment detects an operation input to the emblem 4, for example, under the condition that the security requirements of an electronic key or the like are satisfied, the door ECU 10 opens a lock device 30 arranged in the back door 3. Further, the vehicle 1 of the present embodiment includes a power back door device 40 (PBD) that uses a motor (not shown) as a drive source. The door ECU 10 controls actuation of the power back door device 40 to open the back door 3.

Figure 2:
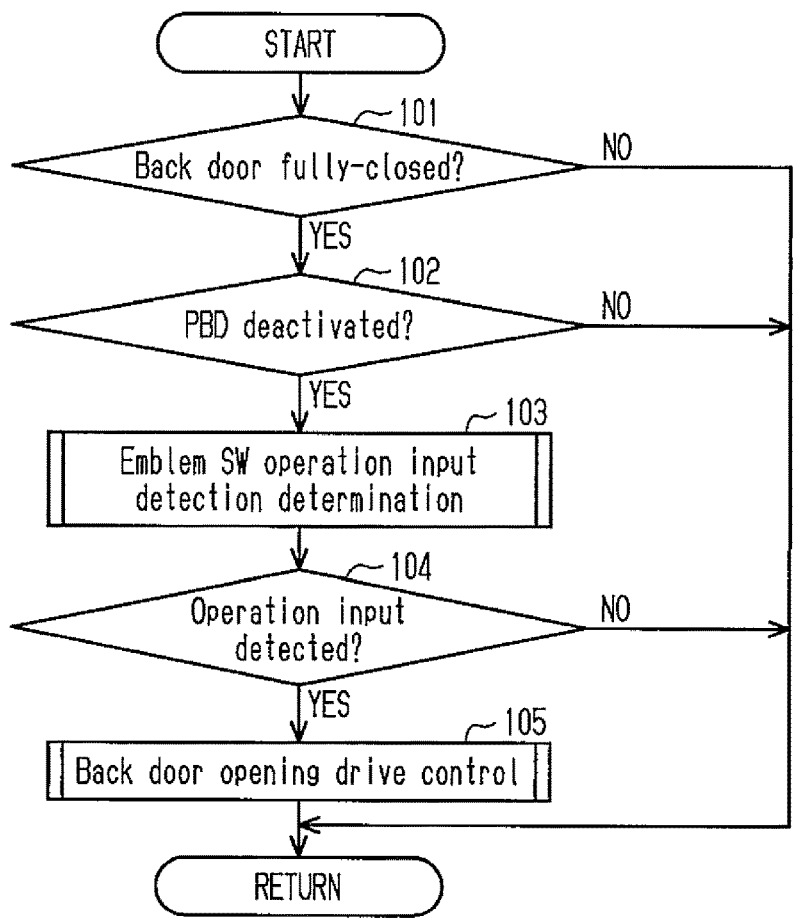
FIG. 2 is a flowchart showing the procedures for processing opening drive control of the back door using the emblem switch shown in FIG. 1.

Specifically, as shown in the flowchart of FIG. 2, when the back door is in a fully-closed state (step 101: YES) and the power back door device 40 is deactivated (step 102: YES), the door ECU 10 of the present embodiment determines detection of an operation input to the emblem 4 (step 103). When the door ECU 10 detects an operation input to the emblem (step 104: YES), the door ECU 10 performs opening drive control on the back door 3 (step 105).

Calibration on Capacitance Sensor

The calibration on the capacitance sensor 5 executed by the door ECU 10 of the present embodiment will now be described.

The door ECU 10 of the preset embodiment functions as a sensor output correction unit (calibration device) that calibrates the capacitance sensor 5 in order to set a reference for the sensor output S of the capacitance sensor 5.

Figure 3:
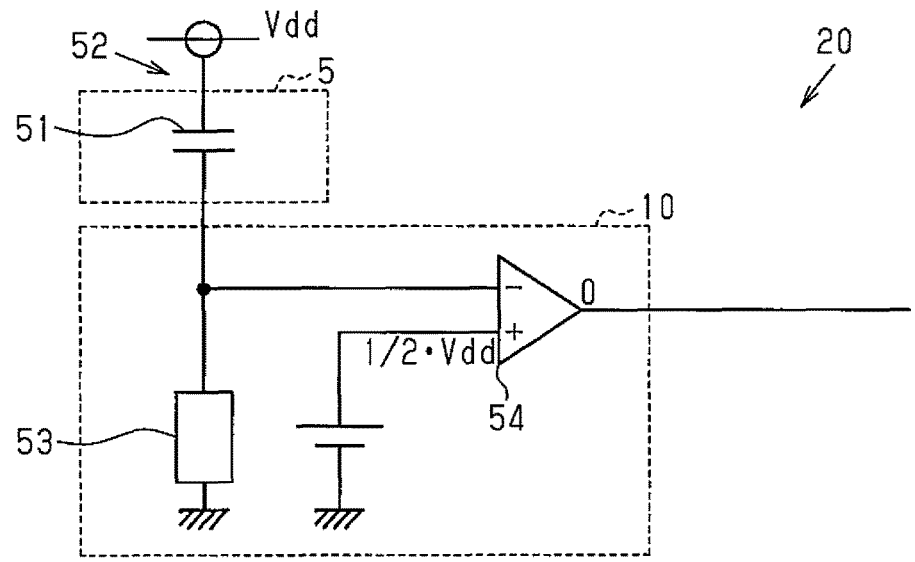
FIG. 3 is a circuit diagram showing the function of a door ECU serving as a sensor output correction unit that calibrates a capacitance sensor shown in FIG. 1.

Specifically, as shown in FIG. 3, the door ECU 10 of the present embodiment includes an adjustment circuit 53 that configures a serial circuit 52 with a capacitor 51 (detection channel) formed by an electrode (not shown) of the capacitance sensor 5. Further, the door ECU 10 includes a comparator 54 (operational amplifier) of which the inputs are a neutral potential at the serial circuit 52 and "the ½ potential (½·Vdd)" of the power voltage (Vdd) applied to the serial circuit 52. The adjustment circuit 53 functions so that the output of the comparator 54 becomes "0" to allow the door ECU 10 of the present embodiment to calibrate the capacitance sensor 5.

More specifically, the door ECU 10 of the present embodiment cyclically calibrates the capacitance sensor 5 in predetermined intervals (t=t0) (fixed interval calibration). That is, the door ECU 10 functions as a fixed interval correction unit. In more detail, the sensor output correction unit functions as the fixed interval correction unit. Further, the door ECU 10 of the present embodiment receives a vehicle speed V (refer to FIG. 1) and detects movement of the vehicle 1 based on the vehicle speed V. Specifically, in the emblem switch 20 of the present embodiment, when the vehicle speed V becomes greater than or equal to a first predetermined speed indicating a traveling state (V≥V1) and then becomes less than or equal to a second predetermined speed indicating a stopped state (V≥V2), the door ECU 10 serving as a movement detector determines that the vehicle 1 has moved. When movement of the vehicle 1 has been detected, that is, at a timing at which the vehicle 1 shifts from the traveling state to the stopped state, the door ECU 10 of the present embodiment calibrates the capacitance sensor 5 (movement time calibration). That is, the door ECU 10 functions as a movement time correction unit. More specifically, the sensor output correction unit functions as the movement time correction unit.

The procedures of the calibration on the capacitance sensor 5 executed by the door ECU 10 of the present embodiment will now be described.

Figure 4:
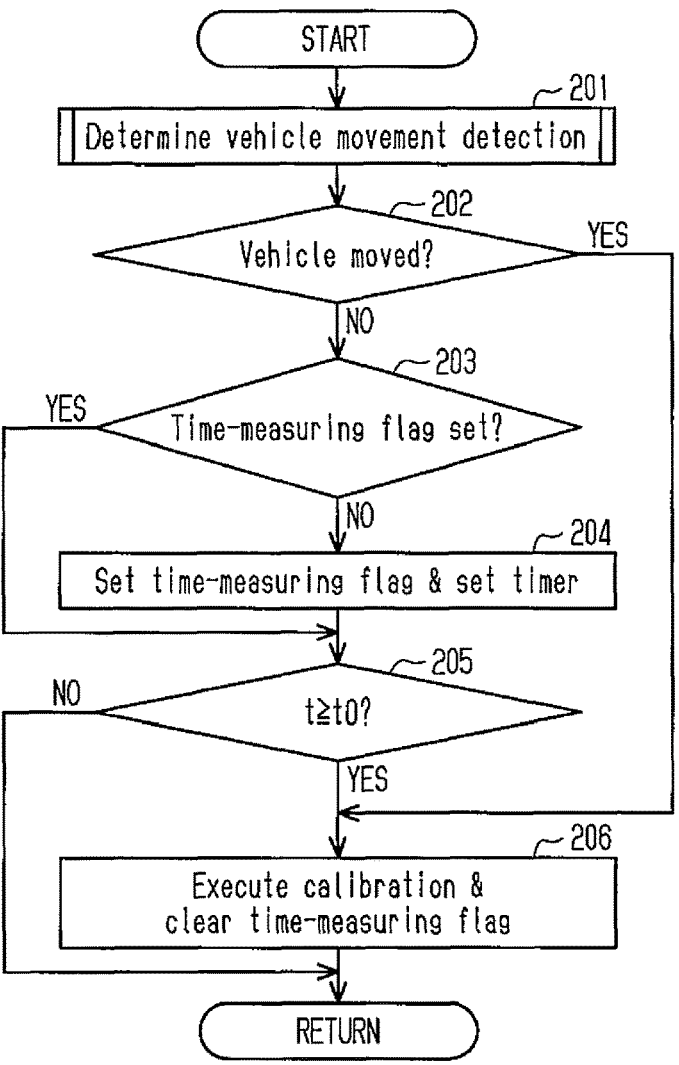
FIG. 4 is a flowchart showing the calibration procedures executed by the door ECU shown in FIG. 1.

As shown in the flowchart of FIG. 4, the door ECU 10 of the present embodiment executes a vehicle movement detection determination (step 201). When the determination result does not indicate movement of the vehicle (step 202: NO), the door ECU 10 of the present embodiment then determines whether or not a time-measuring flag has been set (step 203). When the time-measuring flag has not yet been set (step 203: NO), the time-measuring flag is set and a timer is set to measure an elapsed time t (t=0, step 204). In step 203, when the time-measuring flag has already been set (step 203: YES), the process of step 204 is not executed.

Next, the door ECU 10 determines whether or not the elapsed time t from when the time-measuring flag was set has reached a predetermined time t0 that is set in advance as a predetermined interval in which calibration is executed (step 205). When the elapsed time t has reached the predetermined time t0 (t≥t0, step 205: YES), the door ECU 10 calibrates the capacitance sensor 5 (step 206).

In step 206, the door ECU 10 of the present embodiment clears the time-measuring flag after executing the calibration. In step 205, when the elapsed time t has not reached the predetermined time t0 (t<t0, step 205: NO), the door ECU 10 does not execute the process of step 206.

When the vehicle movement detection determination in step 201 indicates movement of the vehicle (step 202: YES), the door ECU 10 of the present embodiment calibrates the capacitance sensor 5 in step 206 without executing the processes of steps 203 to 205. Thus, the emblem switch 20 of the present embodiment executes calibration during movement of the vehicle independently from the calibration executed in predetermined intervals (t0).

The operation of the emblem switch 20 of the present embodiment will now be described.

Figure 5:
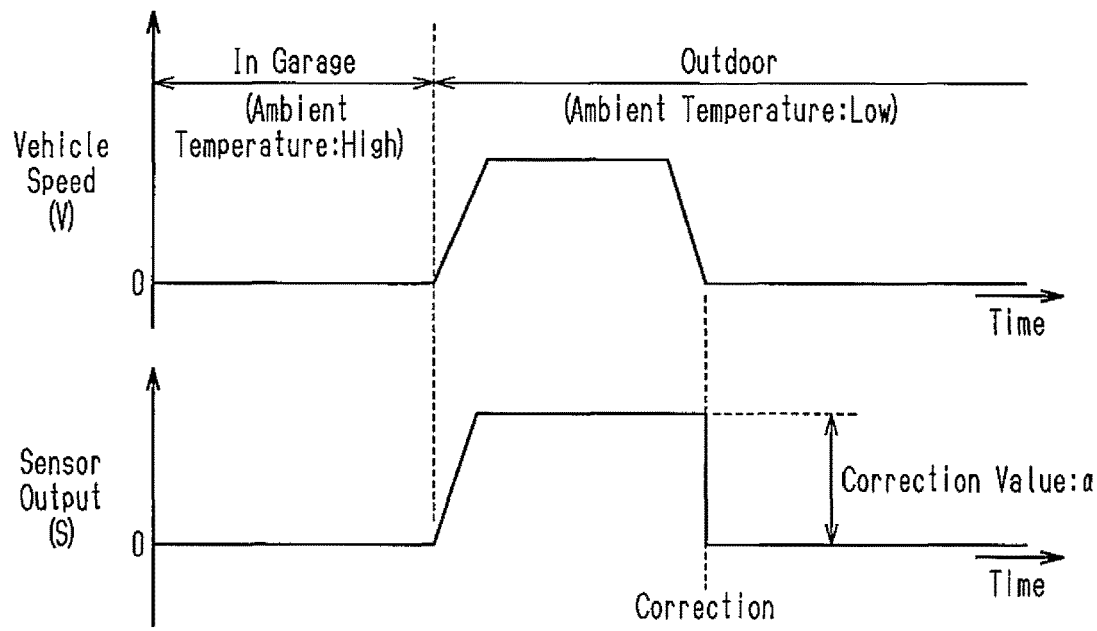
FIG. 5 is a diagram showing the operation of calibration executed when the vehicle is moving (difference between high and low temperatures).

As shown in FIG. 5, when, for example, the vehicle 1 is moved out into the cold from a warm garage, a change in the ambient temperature differentiates the capacitance of the capacitor 51 (refer to FIG. 3), which is formed by the capacitance sensor 5 (electrode of capacitance sensor 5). This results in an offset (discrepancy) in the sensor output S (detection value Sd of sensor output S) of the capacitance sensor 5.

However, even under such a situation, the emblem switch 20 of the present embodiment executes calibration (correction) of the capacitance sensor 5 at a timing at which the vehicle 1 shifts to the stopped state. That is, when the door ECU 10 executes the movement time calibration, a new reference is set under an environment in which the ambient temperature has changed for the sensor output S of the capacitance sensor 5. Thus, even under a situation in which the ambient temperature of the capacitance sensor 5 suddenly changes, the emblem switch 20 of the present embodiment can maintain the satisfactory detection sensitivity for the operation input.

Figure 6:
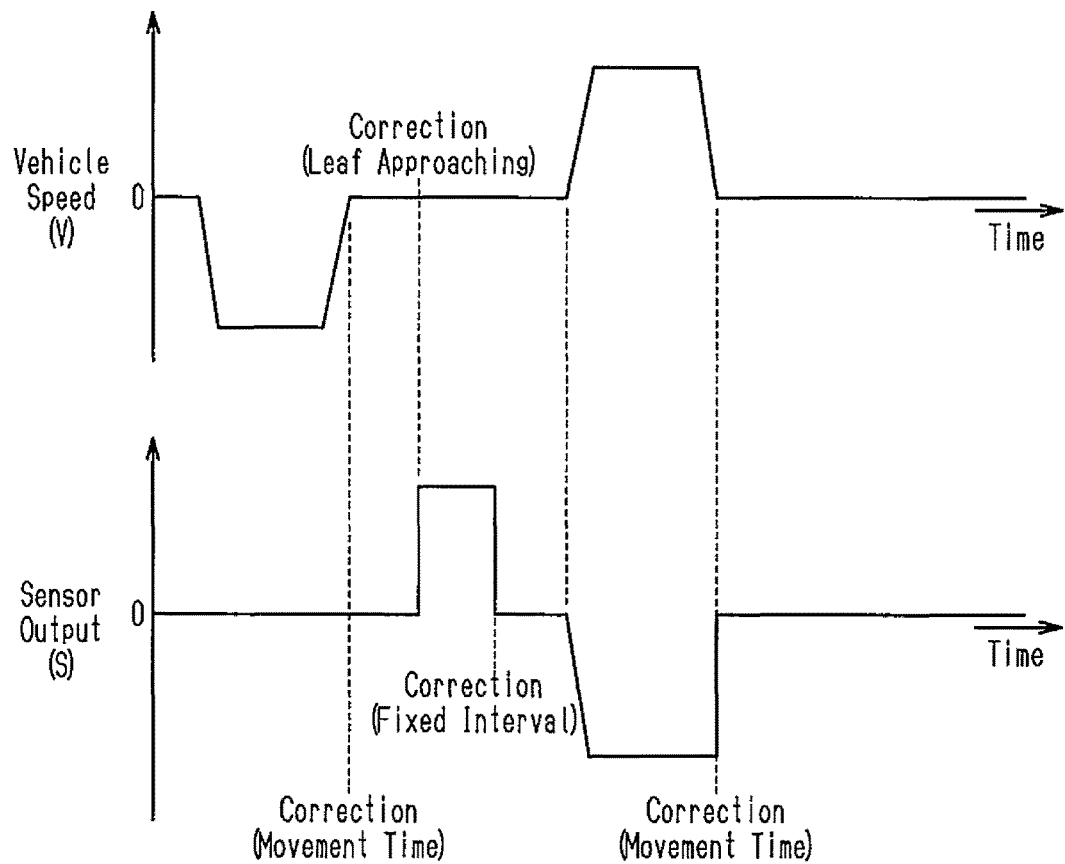
FIG. 6 is a diagram showing the operation of calibration executed when the vehicle is moving (leaf approaching).

As shown in FIG. 6, the sensor output S of the capacitance sensor 5 also changes when the vehicle 1 is in the stopped state and a detection subject that is not intended as an operation input, such as the leaf of a plant wet by rainwater, is located proximate to the emblem 4 forming the operation input unit of the emblem switch 20. In the emblem switch 20 of the present embodiment, when the fixed interval calibration is executed in such a state, a new reference is set for the sensor output S of the capacitance sensor 5 in the state in which the detection subject or the like is proximate.

Further, in this state, if the vehicle 1 moves and the detection subject is separated from the emblem 4 serving as the operation input unit, the sensor output S of the capacitance sensor 5 is offset. However, in the emblem switch 20 of the present embodiment, even in such a situation, a new reference is set for the sensor output S of the capacitance sensor 5 under an environment in which a detection subject does not exist in the vicinity of the emblem 4 with the door ECU 10 performing the movement time calibration. Thus, even when a situation in which a detection subject being not the intended operation input exists in the vicinity of the emblem 4, which serves as the operation input unit, is shifted to a situation in which the detection subject as such does not exist, the emblem switch 20 of the present embodiment maintains the satisfactory detection sensitivity of the operation input.

The present embodiment has the advantages described below.

(1) The emblem switch 20, which serves as the operation input detection device, includes the door ECU 10, which serves as the operation input detector that detects an operation input to the emblem 4 based on the sensor output S of the capacitance sensor 5 that changes when a detection subject moves toward and away from the emblem 4 of the vehicle 1, which serves as the operation input unit. Further, the door ECU 10 detects movement of the vehicle 1. When movement of the vehicle 1 has been detected, the capacitance sensor 5 is calibrated in order to set a reference for the sensor output S.

In the above configuration, even when the vehicle 1 moves and the environment changes, a new reference is set for the sensor output S of the capacitance sensor 5 under the changed environment. This maintains the satisfactory detection sensitivity for the operation input while reducing power consumption.

(2) The door ECU 10 performs a calibration for the capacitance sensor 5 at a timing at which the vehicle 1 shifts from the traveling state to the stopped state.

More specifically, an operation input to the emblem 4 arranged on the outer surface (outer surface 3s of back door 3) of the vehicle 1 is usually performed by the user when the vehicle 1 is stopped. Accordingly, the above configuration maintains the satisfactory detection sensitivity for the operation input while further effectively reducing power consumption.

The above embodiment may be modified as described below.

In the above embodiment, the present invention is applied to the emblem switch 20 that uses the emblem 4 of the vehicle 1, which is arranged on the outer surface 3s of the back door 3, as the operation input unit. The opening drive control is executed on the back door 3 when an operation input to the emblem 4 is detected.

Instead, the control content started by the detection of an operation input may be set to any content such as locking and unlocking of a door lock. Further, the control subject does not necessarily have to be the back door 3 and may be, for example, a side door or a hood. In addition, the position of the emblem 4 serving as the operation input unit may be changed to, for example, a position on a hood or a front grille. Moreover, as long as the capacitance sensor 5 is arranged in the operation input unit on the vehicle surface, the operation input unit does not have to be the emblem 4 of the vehicle 1.

In the above embodiment, the capacitance sensor 5 is calibrated at a timing at which the vehicle 1 shifts from a traveling state to a stopped state. Instead, the capacitance sensor 5 may be repeatedly calibrated in intervals after movement of the vehicle is detected.

Figure 7A:
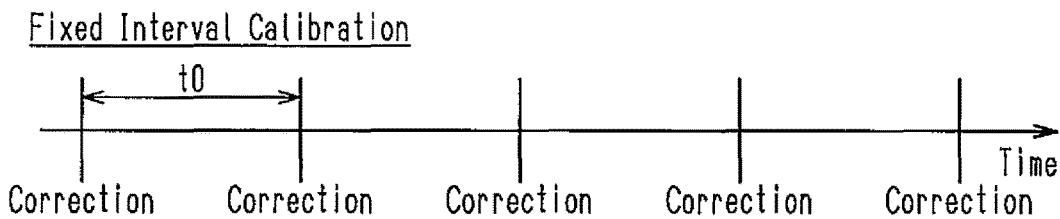
FIGS. 7A and 7B are timing charts showing another example of calibration.
Figure 7B:
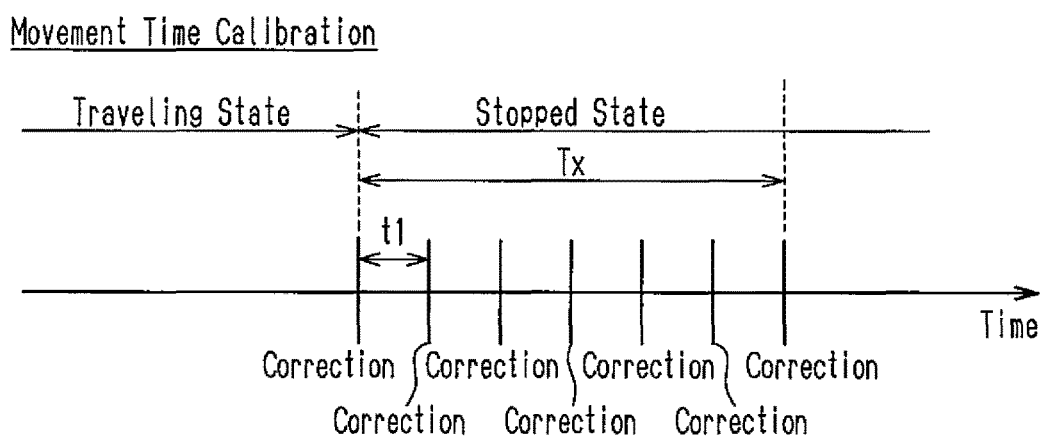

Further, as shown in the case of FIGS. 7A and 7B, an execution interval (predetermined time t1) of the movement time calibration executed after movement of the vehicle 1 is detected is shorter than a predetermined interval (predetermined time t0) in which the fixed interval calibration is executed.

More specifically, environmental changes resulting from movement of the vehicle 1, for example, changes in the ambient temperature of the capacitance sensor 5 arranged inside the emblem 4, often progress slowly over time to a certain extent. In this regard, the above configuration allows a new reference to be periodically set for the sensor output S of the capacitance sensor 5 in correspondence with the environmental changes of the capacitance sensor 5, which progress over time, and variations in capacitance caused by the environmental changes. Further, a new reference can be periodically set for the sensor output of the capacitance sensor in a longer section by setting the execution interval (predetermined time t1) of the movement time calibration to be shorter than the predetermined interval (predetermined time t0) in which the fixed interval calibration is executed. This maintains the satisfactory detection sensitivity of the operation input further effectively.

In the various type of the vehicle 1, an on-board power supply (battery) is charged when the vehicle 1 travels. This is advantageous because power does not decrease even when the repetition of the movement time calibration increases power consumption.

Further, such movement time calibration repeated in intervals may be continued until environmental changes of the capacitance sensor 5, which progress over time, and variations in the capacitance caused by the environmental changes stabilize. That is, the execution interval can be lengthened by terminating the movement time calibration and executing only the fixed interval calibration. Accordingly, the power consumption is improved.

Figure 8:
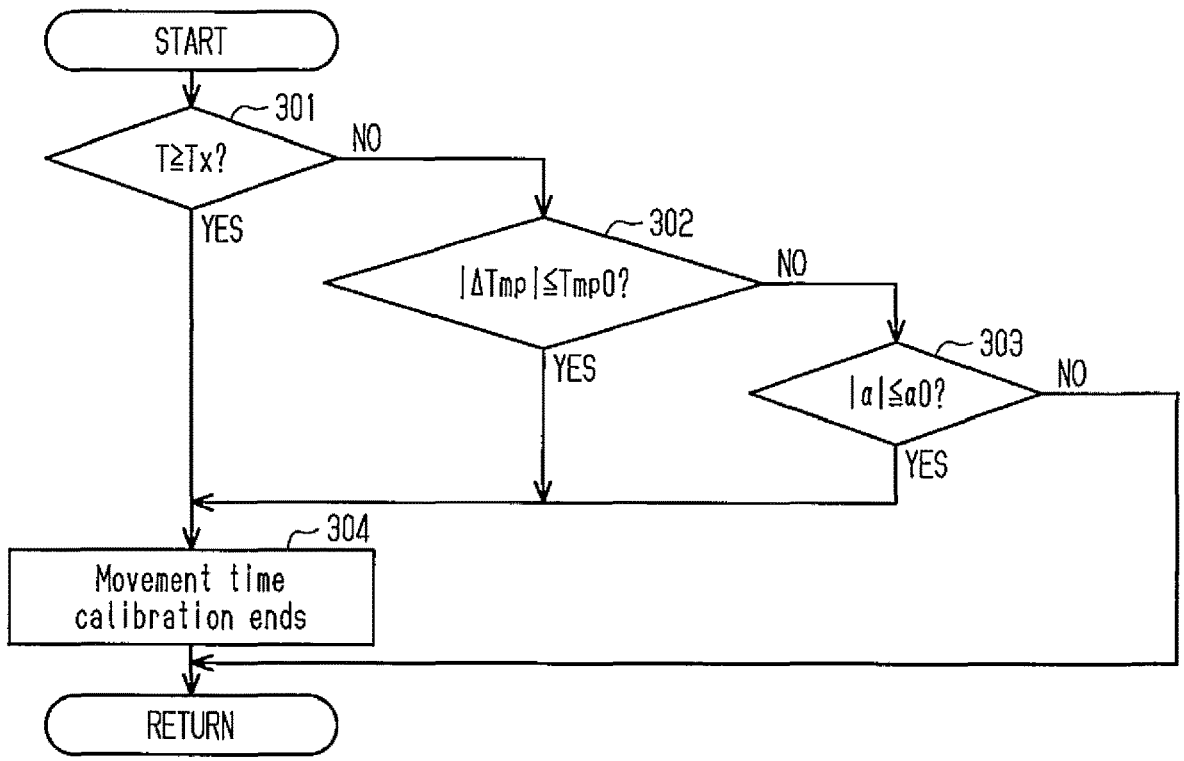
FIG. 8 is a flowchart showing the procedures of a terminating determination in a further example of calibration that is repeatedly executed after the vehicle shifts to a stopped state.

For example, as shown in the flowchart of FIG. 8, it is determined whether or not an elapsed time T from when the vehicle 1 shifted from the traveling state to the stopped state has reached a predetermined time Tx that is set in advance (step 301). Further, it is determined whether or not the amount of change ($|\Delta Tmp|$) in the ambient temperature at which the capacitance sensor 5 is arranged is less than or equal to a predetermined threshold value Tmp0 (step 302). In addition, it is determined whether or not the difference between a new reference that is set for the sensor output S of the capacitance sensor 5 by executing the calibration and a previous reference, i.e., a correction value $\alpha$ (or absolute value of correction value $\alpha$, refer to FIG. 5), is less than or equal to a predetermined threshold value $\alpha 0$ (step 303). The correction value $\alpha$ obtained by executing the movement time calibration can be obtained from an output of the comparator 54 (refer to FIG. 3) used for the calibration. It is preferable that the execution of the movement time calibration terminates when any one of the determination conditions of steps 301 to 303 is satisfied, (step 304).

More specifically, when a certain time elapses from when the vehicle 1 shifted from the traveling state to the stopped state (T≥Tx, step 301: YES), the environmental changes of the capacitance sensor 5, which progress over time, and the variations in the capacitance caused by the environmental changes stabilize. Further, when the amount of change in the ambient temperature Tmp is small enough, that is, when the ambient temperature Tmp of the capacitance sensor 5 has stabilized ($|\Delta Tmp| \leq Tmp0$, step 302: YES), the capacitor 51 (refer to FIG. 3) formed by the capacitance sensor 5 is also likely to have stabilized. When the correction value $\alpha$ (absolute value of correction value $\alpha$) obtained by the movement time calibration executed in relatively short intervals is small ($|\alpha| \leq \alpha 0$, step 303: YES), this directly indicates that the capacitance of the capacitor 51 formed by the capacitance sensor 5 is stable. Accordingly, the above configuration maintains the satisfactory detection sensitivity for an operation input while reducing the power consumption.

For determining the termination of the movement time calibration, any one of the following may be solely used: elapsed time T from when the vehicle 1 shifted to the stopped state; stabilization of the ambient temperature Tmp in which the capacitance sensor 5 is arranged; and decreases in the correction value α caused by execution of calibration. Further, termination may directly be determined when the measured capacitance of the capacitor 51 formed by the capacitance sensor 5 stabilizes. The termination determination of the movement time calibration may also be performed by combining these conditions.

Figure 10:
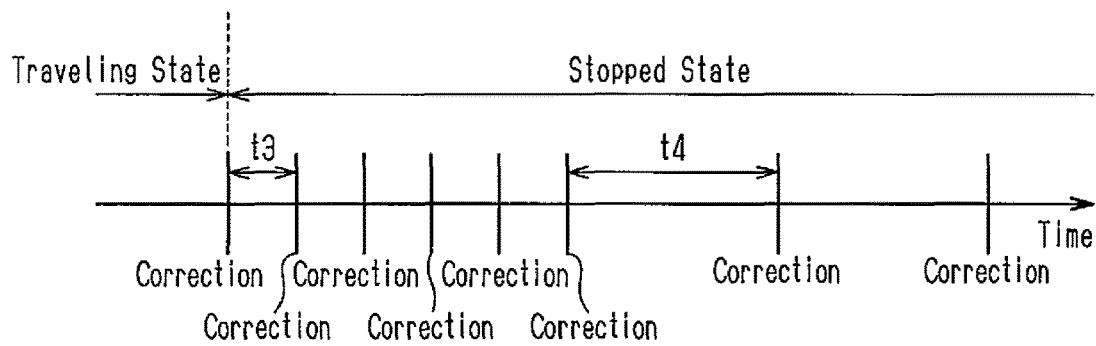
FIG. 10 is a timing chart showing a further example of calibration.

In addition, as shown in FIG. 10, calibration is executed at a timing at which the vehicle 1 shifts from the traveling state to the stopped state, not when the vehicle 1 is in the traveling state. Subsequently, calibration is executed in predetermined intervals (t3). After stabilization of the environmental changes of the capacitance sensor 5, which progress over time, and the variations in the capacitance caused by the environmental changes when the vehicle 1 moves, the execution interval may be lengthened to execute calibration in predetermined intervals (t4) (t3<t4).

Figure 9:
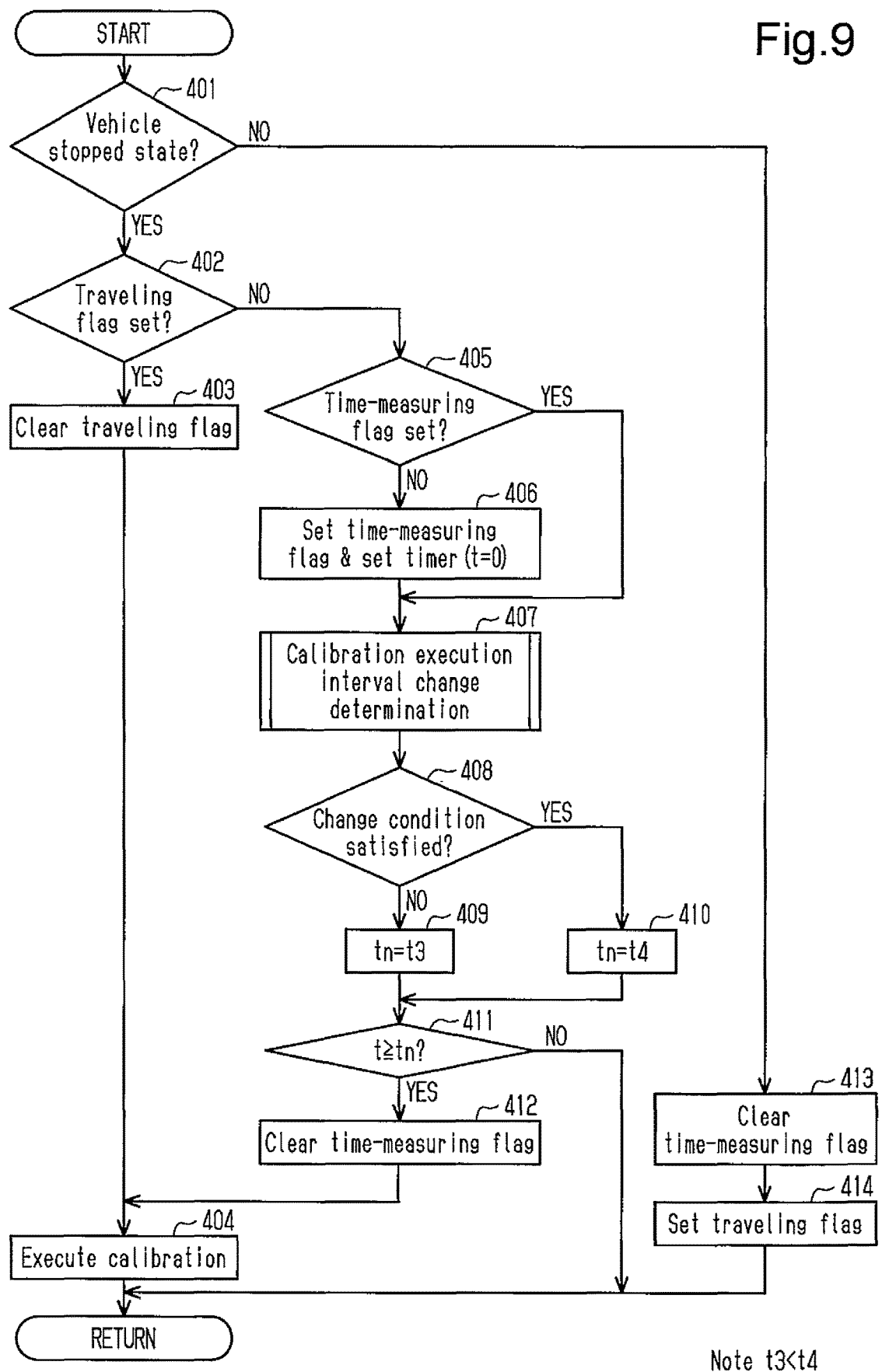
FIG. 9 is a flowchart showing a further example of calibration.

More specifically, as shown in the flowchart of FIG. 9, when the vehicle 1 is in the stopped state (step 401: YES), the door ECU 10 first determines whether or not a traveling flag has been set (step 402). When the traveling flag has been set (step 402: YES), that is, when it is determined that the vehicle 1 has now shifted from the traveling state to the stopped state, the traveling flag is cleared (step 403) and the capacitance sensor 5 is calibrated (step 404).

In step 402, when the traveling flag has not been set (step 402: NO), the door ECU 10 then determines whether or not a time-measuring flag has been set (step 405). When the time-measuring flag has not yet been set (step 405: NO), the time-measuring flag is set and a timer is set to measure the elapsed time t (t=0, step 406). In step 405, when the time-measuring flag has already been set (step 405: YES), the door ECU 10 does not execute the process of step 406.

Subsequently, the door ECU 10 executes a process for determining whether or not to change a calibration execution interval tn (step 407). In this example, the calibration execution interval change determination in step 407 is performed using the same determination conditions as the termination determination of the movement time calibration (refer to FIG. 8, steps 301 to 304). When none of the determination conditions has been satisfied (step 408: NO), the door ECU 10 sets the predetermined time t3 as the execution interval tn (tn=t3, step 409). When any one of the determination conditions is satisfied (step 408: YES), the door ECU 10 sets the predetermined time t4 as the execution interval tn (tn=t4, step 410).

Further, the door ECU 10 determines whether or not the elapsed time t after setting the time-measuring flag has reached the predetermined time (t3 or t4) that is set as the execution interval tn (step 411). When the elapsed time t has reached the predetermined time (t3 or t4) set as the calibration execution interval tn (t≥tn, step 411: YES), the door ECU 10 clears the time-measuring flag (step 412). Then, the door ECU 10 calibrates the capacitance sensor 5 in step 404.

In step 411, when the elapsed time t has not reached the predetermined time (t3 or t4) set as the calibration execution interval tn (t<tn, step 411: NO), the door ECU 10 does not execute the processes of steps 412 and 404. In step 401, when the door ECU 10 determines that the vehicle 1 is in the traveling state (step 401: NO), the door ECU 10 clears the time-measuring flag (step 413) and sets the traveling flag (step 414).

More specifically, when the vehicle is in the traveling state, the door ECU 10 does not calibrate the capacitance sensor 5. An operation input performed by the user on the emblem 4 arranged on the outer surface (outer surface 3s of back door) of the vehicle 1 is usually performed in a state in which the vehicle 1 is stopped. Thus, even if the sensor output S of the capacitance sensor 5 is offset when the vehicle 1 is in the traveling state, an operation input performed by the user after the vehicle is stopped is not greatly affected. Further, after environmental changes of the capacitance sensor 5, which progress over time, and variations in the capacitance caused by the environmental changes stabilize, the occurrence of an offset in the sensor output S of the capacitance sensor 5 will be limited. Thus, the above configuration maintains the satisfactory detection sensitivity of the operation input further effectively while reducing power consumption.

Figure 11:
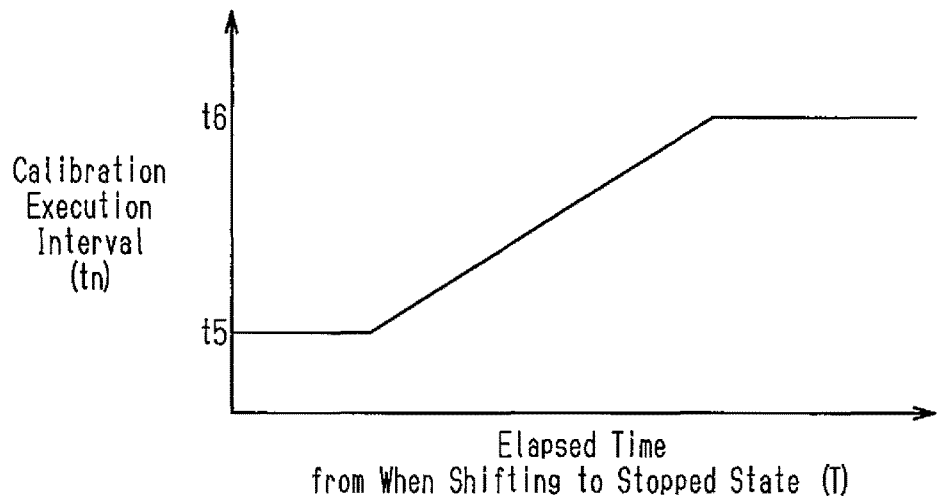
FIG. 11 is a diagram showing a further example of calibration (gradual lengthening of execution interval).

Further, as shown in FIG. 11, the execution interval tn of calibration may be continuously lengthened from a predetermined time t5 to a predetermined time t6 in accordance with the elapsed time T from when the vehicle 1 shifted from the traveling state to the stopped state. In addition, the execution interval tn may be gradually lengthened in a stepwise manner. Alternatively, the execution interval tn of calibration may be lengthened as the amount of change (|ΔTmp|) in the ambient temperature decreases or as the variations in the capacitance of the capacitor 51 formed by the capacitance sensor 5 decrease, that is, as the amount of change and the variation in capacitance of the capacitor 51 stabilize.

Figure 12:
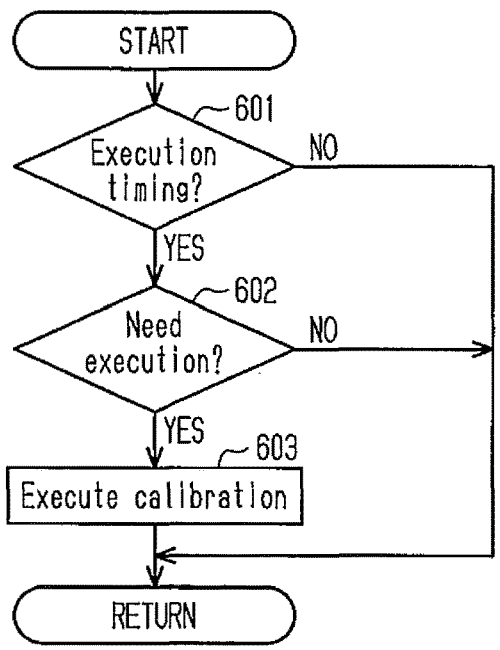
FIG. 12 is a flowchart showing a further example of calibration (determination of execution confirmation).

In addition, as shown in the flowchart of FIG. 12, when executing calibration (step 601: YES), it is determined whether or not the capacitance sensor 5 needs to be calibrated (step 602). That is, the door ECU 10 functions as an execution confirmation determination unit. More specifically, the sensor output correction unit serves as the execution confirmation determination unit. The execution confirmation determination of calibration in step 602 can be performed from the same viewpoint as the terminating determination of the movement time calibration (refer to FIG. 8, steps 301 to 304). Further, for example, the execution of the calibration may be determined as being unnecessary, for example, on the grounds that the vehicle 1 is in the traveling state or that the execution timing of the movement time calibration and the execution timing of the fixed interval calibration are close to each other. In the execution confirmation determination, the capacitance sensor 5 is calibrated (step 603) only when determined as being necessary (step 602: YES).

More specifically, for example, when an offset does not occur in the sensor output S of the capacitance sensor 5 or when an offset that occurs in the sensor output S does not greatly affect an operation input of the user, the capacitance sensor 5 is not calibrated. This maintains the satisfactory detection sensitivity of the operation input further effectively while reducing power consumption.

In the above embodiment, when the vehicle speed V becomes greater than or equal to the first predetermined speed indicating the traveling state (V≥V1) and then becomes less than or equal to the second predetermined speed indicating the stopped state (V≤V2), the door ECU 10 serving as the movement detector determines that the vehicle 1 has moved. Instead, for example, the condition of the movement detection determination of the vehicle 1 may be that the vehicle speed V becomes greater than or equal to the first predetermined speed indicating the traveling state or that the vehicle speed V that is greater than or equal to the first predetermined vehicle speed continues for a predetermined time or more. That is, calibration on the capacitance sensor 5 when detecting movement of the vehicle 1 does not have to be executed in a state in which the vehicle 1 is stopped. For example, calibration on the capacitance sensor 5 may be executed when the vehicle 1 is moved by another vehicle, such as when towed or transported.

The invention claimed is:

1. An operation input detection device comprising:
an operation input detector that detects an operation input to an operation input unit, which is arranged on a vehicle surface, based on a sensor output of a capacitance sensor that changes when a detection subject moves toward and away from the operation input unit;
a movement detector that detects a speed of a vehicle and is configured to determine that the vehicle shifts from a traveling state to a stopped state when the vehicle speed becomes greater than or equal to a first predetermined speed indicating the traveling state and then becomes less than or equal to a second predetermined speed indicating the stopped state; and
a sensor output correction unit that executes calibration on the capacitance sensor when the movement detector determined that the vehicle shifted from the traveling state to the stopped state.

2. The operation input detection device according to claim 1, wherein the sensor output correction unit executes the calibration at a timing at which the vehicle shifts from a traveling state to a stopped state.

3. The operation input detection device according to claim 1, wherein the sensor output correction unit repeatedly executes the calibration in intervals after movement of the vehicle is detected.

4. The operation input detection device according to claim 3, wherein the sensor output correction unit lengthens an execution interval of the calibration in accordance with an elapsed time from when the vehicle shifted from a traveling state to a stopped state.

5. The operation input detection device according to claim 3, wherein the sensor output correction unit lengthens an execution interval of the calibration when an ambient temperature stabilizes at a position where the capacitance sensor is arranged.

6. The operation input detection device according to claim 3, wherein the sensor output correction unit lengthens an execution interval of the calibration when capacitance of a capacitor formed by the capacitance sensor stabilizes.

7. The operation input detection device according to claim 3, wherein
the sensor output correction unit includes
a movement time correction unit that executes the calibration when movement of the vehicle is detected, and
a fixed interval correction unit that executes calibration on the capacitance sensor in a predetermined interval, wherein
an execution interval of the calibration executed by the movement time correction unit is shorter than the predetermined interval in which the fixed interval correction unit executes the calibration.

8. The operation input detection device according to claim 1, wherein the sensor output correction unit includes an execution confirmation determination unit that determines whether or not execution of the calibration is necessary at an execution timing of the calibration.

9. The operation input detection device according to claim 1, wherein the sensor output correction unit does not execute the calibration when the vehicle is in a traveling state.

10. A calibration device for a capacitance sensor, wherein the calibration device executes calibration on a capacitance sensor arranged in an operation input unit on a vehicle surface when movement of a vehicle is detected,
wherein the movement of the vehicle is detected by a movement detector that detects a speed of the vehicle and is configured to determine that the vehicle shifts from a traveling state to a stopped state when the vehicle speed becomes greater than or equal to a first predetermined speed indicating the traveling state and then becomes less than or equal to a second predetermined speed indicating the stopped state, and
wherein calibration is executed on the capacitance sensor when the movement detector determined that the vehicle shifted from the traveling state to the stopped state.

* * * * *